United States Patent Office 2,895,843
Patented July 21, 1959

2,895,843

PROCESS FOR INCORPORATING TITANIUM DIOXIDE INTO CELLULOSE ESTER SOLUTIONS DISSOLVED IN ALIPHATIC ACIDS

Maurice Lepin, Le Peage de Roussillon, France, assignor to Societe Rhodiaceta, Paris, France, a body corporate of France No Drawing. Application July 8, 1957
Serial No. 670,374

Claims priority, application France February 5, 1957

5 Claims. (Cl. 106—180)

The present invention relates to a process for the production of solutions in aliphatic acids of cellulose esters, said solutions containing homogeneously and finely divided titanium dioxide as a pigment and being suitable for the production of shaped cellulose ester articles having a dull appearance.

It is known to manufacture threads, fibers, films and analogous products, of which the appearance is more or less dull, by shaping solutions of cellulose esters into which titanium dioxide has been incorporated.

However, when it is desired to produce these products starting from cellulose ester solutions dissolved in aliphatic acids, for example starting from a solution of cellulose triacetate in acetic acid, great difficulties are met with in order to obtain a sufficiently homogeneous dispersion of finely divided titanium dioxide in the solution from which it is desired to produce the shaped articles.

It should be noted that the dispersion of the titanium dioxide in a cellulose triacetate solution dissolved in acetic acid is very difficult to effect, even when the duration of the dispersion operation is carried out for a considerable length of time; when, in order to avoid such a prolonged (and therefore undesirable) dispersion operation, there is used a titanium dioxide suspension in a carrier for the titanium dioxide (said carrier being a secondary cellulose acetate solution in acetone) prior to dispersion in the acetic acid solution of cellulose triacetate, the mixing of the said suspension with the solution of the cellulose triacetate in acetic acid cannot be produced in homogeneous fashion. In both the aforesaid cases the resulting spinning solution contains titanium dioxide aggregates which cause frequent stoppages of the filters and closure of many of the orifices in the spinnerets; furthermore, the resulting threads have bad dynamometric qualities.

The present invention provides a process which enables avoidance or minimising of the above mentioned disadvantages in the incorporation of titanium dioxide into solutions of cellulose esters in aliphatic acids.

As used herein, the term "cellulose ester solutions in aliphatic acids" means solutions in an aliphatic acid or a mixture of aliphatic acids (e.g. formic, acetic, propionic and butyric acid) of a simple cellulose ester or a mixed cellulose ester (e.g. cellulose formate, acetate, propionate, acetopropionate and acetobutyrate) and includes not only solutions obtained directly from the esterification operation submitted to one or more optional after-treatments (e.g. stabilization, hydrolysis to a greater or lesser extent, neutralisation of catalysts, etc.) but includes also solutions produced by dissolving a previously precipitated cellulose ester, said precipitated ester having been washed and dried before dissolution.

The present invention is based on the discovery that it is possible to produce homogeneously distributed and finely divided titanium dioxide suspensions in aliphatic acid cellulose ester solutions when the titanium dioxide, prior to its suspension in the said solutions, is supplied in the form of a concentrate, said concentrate consisting of titanium dioxide suspended in a medium of a cellulose ester dissolved in two solvents: (i) an aliphatic acid, and (ii) an aliphatic acid ester cosolvent.

Thus the present invention consists in a process of producing cellulose ester solutions which are suitable for the production of shaped articles, which process comprises incorporating titanium dioxide into a solution of a cellulose ester dissolved in an aliphatic acid, said titanium dioxide being introduced into said solution in the form of a relatively concentrated suspension obtained by suspending the titanium dioxide in a medium of a solution of cellulose ester dissolved in a mixture of an aliphatic acid and an ester selected from the esters of a lower aliphatic carboxylic acid with a diol containing up to 6 carbon atoms selected from 1,1- and 1,2-diols.

It will be appreciated that for the sake of convenience the cellulose ester used in the concentrate and the main solution should be, but need not necessarily be, similar. Furthermore, the aliphatic acid in the concentrate and the main solution should also be similar, although this is not an essential feature of the process of the invention.

The solvent used as cosolvent with the aliphatic acid in order to produce the relatively concentrated titanium dioxide suspension in the cellulose ester main solution belong to the class of esters of lower aliphatic acids with 1,1-diols or 1,2-diols. Preferably ethylidene diacetate is used; furthermore, it is possible to use ethylene or methylene diacetate.

The following examples are given by way of non-limitative illustration so that the invention may be understood better; the parts and percentages mentioned in the examples are parts by weight.

*Example 1*

It is required to obtain a spinning solution containing titanium dioxide, starting from a cellulose triacetate solution obtained directly from the acetylation operation and having a cellulose triacetate content of 12% by weight, the catalyst used in said acetylation operation having been neutralised by a known process.

There is first prepared a suspension of titanium dioxide by introducing successively into a ball mill the following constituents:

60 parts of a mixture consisting of:
  Ethylidene diacetate, 75 parts, and
  Acetic acid, 25 parts,
20 parts of cellulose triacetate solution dissolved in acetic acid (12% content of dry triacetate), and
20 parts of titanium dioxide.

After milling for a period of 6 hours the titanium dioxide in the resulting suspension is present in a very finely divided state and said suspension is highly homogeneous.

There are then introduced into a mixing device the following:

5 parts of the above suspension, and
95 parts of cellulose triacetate solution.

The mixing is effected in known manner and gives rise to a solution containing 1% of titanium dioxide having a fine particle size and the entire material is extremely homogeneous.

The resulting titanium dioxide containing solution may be filtered and shaped in known manner without difficulty, any clogging of filter and shaping device being reduced to a minimum.

*Example 2*

A suspension is produced by introducing into a ball mill the following constituents:

70 parts of a mixture consisting of:
  80 parts of ethylene diacetate, and
  20 parts of acetic acid,
5 parts of dry cellulose acetate having an acetic acid yield of 55%, and
25 parts of titanium dioxide.

After milling for 5 hours the titanium dioxide in the resulting suspension is present in a very finely divided state and said suspension is highly homogeneous.

The following constituents are then mixed as in Example 1.

2.4 parts of the above suspension, and
97.6 parts of a solution of cellulose acetate (acetic acid yield 55%) in acetic acid having a concentration of 14%.

As regards homogeneity, subdivision, filterability and shaping ability, results similar to those of Example 1 are obtained, but this time the solution contains 0.6% of titanium dioxide.

*Example 3*

There is produced a suspension by introducing successively into a ball mill the following constituents:

65 parts of a mixture of:
  Methylene diacetate, 70 parts, and
  Propionic acid, 30 parts,
15 parts of a solution containing 12% of cellulose propionate and coming directly from the esterification operation, and
20 parts of titanium dioxide.

After milling for 7 hours the titanium dioxide in the resulting suspension is present in a very finely divided state and said suspension is highly homogeneous.

The following constituents are then mixed as in Example 1:

6 parts of the above suspension, and
94 parts of the cellulose propionate solution as above.

As regards homogeneity, subdivision, filterability and shaping ability, results similar to those of Example 1 are obtained, but this time the solution contains 1.2% of titanium dioxide.

Although the present invention has been described with particular reference to specific details, it is not intended that such details shall be regarded as limitations upon the scope of the invention except insofar as included in the accompanying claims.

I claim:

1. A process of producing cellulose ester solutions which are suitable for the production of shaped articles, which process comprises incorporating titanium dioxide into a solution of a cellulose ester dissolved in at least one aliphatic carboxylic acid having at most four carbon atoms, said cellulose ester being a simple ester of cellulose with an acid selected from the group consisting of formic, acetic, propionic and butyric acid, said titanium dioxide being introduced into said solution in the form of a relatively concentrated suspension obtained by suspending the titanium dioxide in a medium of a solution of cellulose ester dissolved in a mixture of at least one aliphatic carboxylic acid having at most four carbon atoms and an ester selected from the group consisting of ethylidene diacetate, ethylene diacetate and methylene diacetate.

2. A process of producing cellulose ester solutions which are suitable for the production of shaped articles, which process comprises incorporating titanium dioxide into a solution of a cellulose ester dissolved in at least one aliphatic carboxylic acid having at most four carbon atoms, said cellulose ester being a mixed ester of cellulose with acids, selected from the group consisting of formic, acetic, propionic and butyric acid, said titanium dioxide being introduced into said solution in the form of a relatively concentrated suspension obtained by suspending the titanium dioxide in a medium of a solution of cellulose ester dissolved in a mixture of at least one aliphatic carboxylic acid having at most four carbon atoms and an ester selected from the group consisting of ethylidene diacetate, ethylene diacetate and methylene diacetate.

3. A process of producing cellulose acetate solutions which are suitable for the production of shaped articles, which process comprises incorporating titanium dioxide into a solution of cellulose acetate dissolved in a lower aliphatic carboxylic acid containing at most four carbon atoms, said titanium dioxide being introduced into said solution in the form of a relatively concentrated suspension obtained by suspending the titanium dioxide in a medium of a mixture consisting of (i) ethylidene diacetate, (ii) the said lower aliphatic carboxylic acid containing at most four carbon atoms, and (iii) a solution of the said cellulose acetate.

4. A process of producing cellulose acetate solutions which are suitable for the production of shaped articles, which process comprises incorporating titanium dioxide into a solution of cellulose acetate dissolved in a lower aliphatic carboxylic acid containing at most four carbon atoms, said titanium dioxide being introduced into said solution in the form of a relatively concentrated suspension obtained by suspending the titanium dioxide in a medium of a mixture consisting of (i) ethylene diacetate, (ii) the said lower aliphatic carboxylic acid containing at most four carbon atoms, and (iii) the said cellulose acetate.

5. A process of producing cellulose propionate solutions which are suitable for the production of shaped articles, which process comprises incorporating titanium dioxide into a solution of cellulose propionate dissolved in a lower aliphatic carboxylic acid containing at most four carbon atoms, said titanium dioxide being introduced into said solution in the form of a relatively concentrated suspension obtained by suspending the titanium dioxide in a medium of a mixture consisting of (i) methylene diacetate, (ii) the said lower aliphatic carboxylic acid containing at most four carbon atoms, and (iii) the said cellulose propionate.

References Cited in the file of this patent

UNITED STATES PATENTS

| | | |
|---|---|---|
| 1,488,608 | Matheson | Apr. 1, 1924 |
| 1,522,852 | Young | Jan. 13, 1925 |
| 2,576,268 | Shugar et al. | Nov. 27, 1951 |
| 2,607,703 | Resch et al. | Aug. 19, 1952 |
| 2,661,299 | Paul et al. | Dec. 1, 1953 |

FOREIGN PATENTS

| | | |
|---|---|---|
| 374,356 | Great Britain | June 9, 1932 |